United States Patent [19]
Wellemeyer

[11] Patent Number: 5,331,842
[45] Date of Patent: Jul. 26, 1994

[54] CYCLICAL PRESSURE TESTING APPARATUS

[75] Inventor: Robert G. Wellemeyer, Derby, Kans.

[73] Assignee: Smith Fiberglass Products Inc., Little Rock, Ark.

[21] Appl. No.: 936,427

[22] Filed: Aug. 27, 1992

[51] Int. Cl.⁵ .......................... G01M 3/04; F04B 9/10; F04B 17/00; F04B 35/02
[52] U.S. Cl. ........................... 73/49.5; 417/387; 417/390; 417/401
[58] Field of Search ............... 73/49.1, 49.5; 417/401, 417/390, 387, 385

[56] References Cited

U.S. PATENT DOCUMENTS

| | | | |
|---|---|---|---|
| 1,315,325 | 9/1919 | Nims | 73/49.5 |
| 1,811,138 | 6/1931 | Lassman | 73/49.5 |
| 2,135,721 | 11/1938 | Landenberger | 73/49.5 |
| 3,362,225 | 1/1968 | Noble | 73/49.1 |
| 4,553,212 | 11/1985 | Hayashi et al. | 73/49.1 |

FOREIGN PATENT DOCUMENTS 328143 8/1989 European Pat. Off. ............ 417/387

Primary Examiner—John J. Vrablik
Attorney, Agent, or Firm—David R. Price; James Earl Lowe, Jr.

[57] ABSTRACT

A pressure testing apparatus including a twin cylinder accumulator assembly having a first cylinder and a first piston dividing the first cylinder into first and second chambers. The first chamber communicates with a test specimen and contains a first fluid. The twin cylinder accumulator assembly also includes a second cylinder coaxial with the first cylinder and a second piston, which divides the second cylinder into third and fourth chambers and which is connected to the first piston by a common piston rod. The fourth chamber communicates with a hydraulic pressure unit and is supplied with alternating high and low pressures to cyclically pressurize the first fluid in the fourth chamber and the test specimen communicating therewith. A switch actuator is mounted on the piston rod for actuating first and second proximity sensors to monitor piston rod movement. In the event of a leak in the specimen causing the piston rod to exceed its normal stroke when compressing the fluid in the first chamber, the switch actuator actuates the first proximity sensor to signal a control unit to open a valve to permit make-up fluid to be pumped into the system. The second valve remains open until the piston rod is moved in the reverse direction a distance sufficient to cause the switch actuator to actuate the second proximity sensor to signal the control unit to close the second valve.

8 Claims, 1 Drawing Sheet

CYCLICAL PRESSURE TESTING APPARATUS

BACKGROUND OF THE INVENTION

1. Field of the Invention

The invention relates generally to apparatus for pressure testing a specimen, and more particularly to cyclical pressure testing apparatus utilizing a first fluid to pressurize the specimen and a second fluid to pressurize the first fluid.

2. Reference to Prior Art

A prior art pressure testing apparatus includes a hydraulic pressure unit for cyclically supplying pressurized oil to a fluid separator including a diaphragm separating the oil from water on the other side of the diaphragm. The pressurized oil acts through the diaphragm to cyclically pressurize the water which is supplied to one or more test specimens to thereby subject the test specimen(s) to alternating high and low pressures. Since only the diaphragm separates the oil and water, seepage of fluids across the diaphragm results in cross-contamination of the fluids. In the event of a leak in a specimen, a water make-up pump supplies water to the specimen through a check valve to make up any water loss. This arrangement continually subjects the test specimens to the back pressure of the water pump such that the minimum test pressure is governed by the head developed by the water make-up pump.

SUMMARY OF THE INVENTION

The invention provides an improved pressure testing apparatus which is arranged to efficiently achieve complete pressure cycles between a desired high pressure and ambient pressure and to prevent the cross-contamination of first and second fluids employed in the apparatus. The pressure testing apparatus is operable to cyclically pressure test a specimen despite leakage from the specimen.

More particularly, the invention provides a pressure testing apparatus including a twin cylinder accumulator assembly having a first cylinder and a first piston dividing the first cylinder into first and second chambers. The first chamber communicates with a test specimen and contains a first fluid, such as water. The twin cylinder accumulator assembly also includes a second cylinder coaxial with the first cylinder and a second piston dividing the second cylinder into third and fourth chambers. The fourth chamber alternately communicates with an oil pump to charge the fourth chamber with oil pressure and with an oil return conduit to allow oil pressure in the fourth chamber to be exhausted to an oil reservoir at ambient pressure. A piston rod is provided to interconnect the first and second pistons for common reciprocal movement. Thus, the volume of the first chamber increases (to depressurize the test specimen) in response to a decrease in the volume of the fourth chamber (i.e. oil pressure in fourth chamber exhausted) and the volume of the first chamber decreases (to pressurize the test specimen) in response to an increase in the volume of the fourth chamber (i.e. oil pressure supplied to fourth chamber) to cyclically pressurize the test specimen. By using separate first and second cylinder arrangements for the water and the oil these fluids are kept separate to prevent them from contaminating each other.

To compensate for leaks in the test specimen, the piston rod carries a switch actuator for actuating first and second proximity sensors positioned longitudinally with respect to the piston rod. Under normal operating conditions the piston rod is confined to movement such that the switch actuator does not actuate the first proximity sensor. In the event of a leak in the test specimen, the piston rod will exceed its normal stroke when the water in the first chamber is compressed. This excess movement causes the switch actuator to actuate the first proximity sensor which signals a control unit to open a solenoid actuated second valve to permit make-up water to be pumped into the system. The second valve remains open until the piston rod is moved in the reverse direction (to exhaust the oil pressure in the fourth chamber) a sufficient distance to cause the switch actuator to actuate the second proximity sensor to signal the control unit to close the second valve. The normally closed second valve isolates the water pump from the test specimen so that the specimen is only subjected to the back pressure supplied by the water pump when the system is less than fully charged with water. Thus, the amplitude of the pressure cycles used to test the specimen is not restricted by the back pressure of the water pump.

Other features and advantages of the invention will become apparent to those skilled in the art upon review of the following detailed description, claims and drawings.

Figure 1:
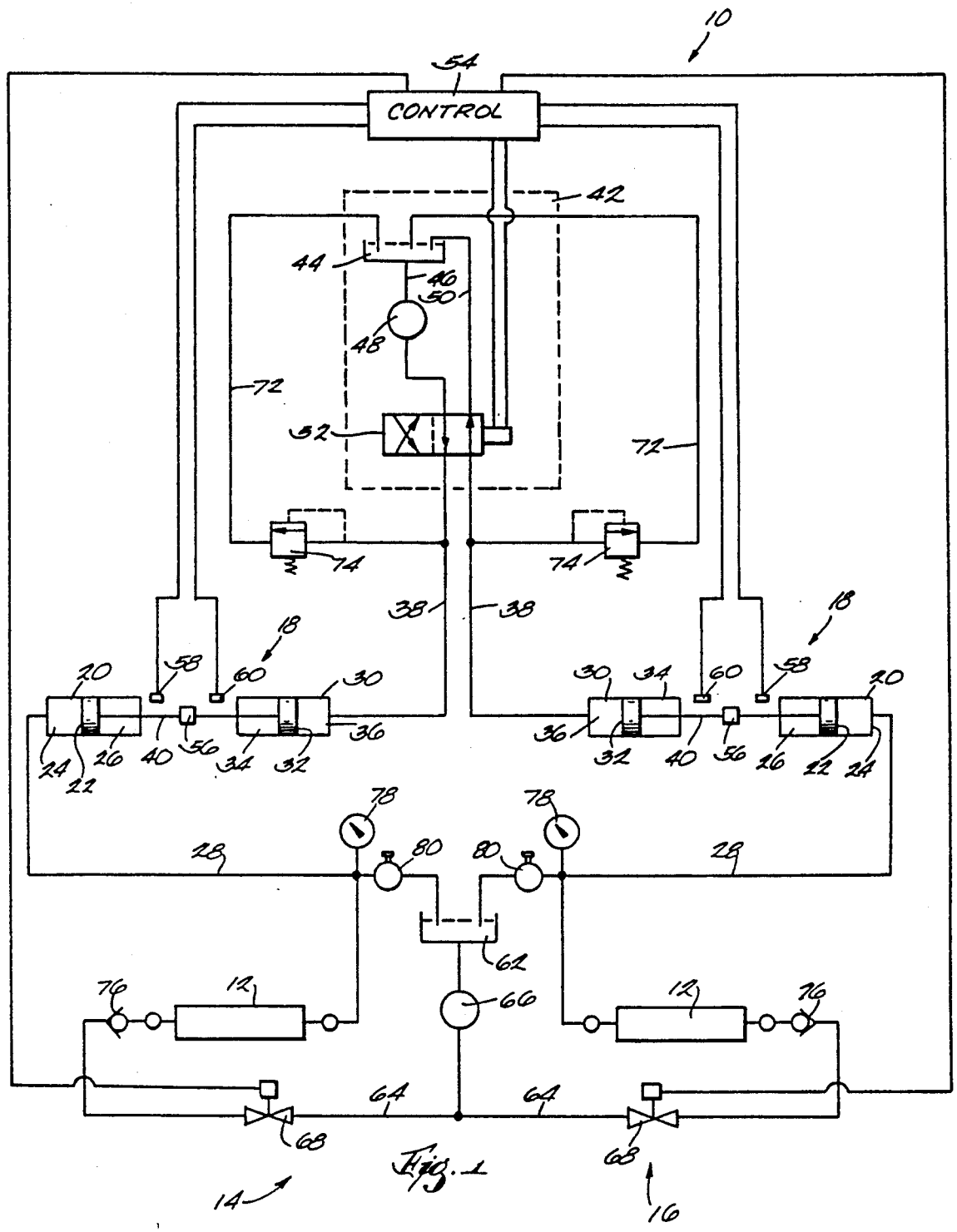
FIG. 1 is a schematic diagram of a pressure testing apparatus embodying various features of the invention.
Figure 2:
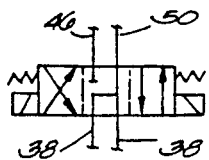
FIG. 2 is a schematic diagram illustrating an alternative arrangement of the first valve 52 shown in FIG. 1.

Before one embodiment of the invention is explained in detail, it is to be understood that the invention is not limited in its application to the details of the construction and the arrangement of components set forth in the following description or illustrated in the drawings. The invention is capable of other embodiments and of being practiced or being carried out in various ways. Also, is to be understood that the phraseology and terminology used herein is for the purpose of description and should not be regarded as limiting.

GENERAL DESCRIPTION

Illustrated in FIG. 1 is a pressure testing apparatus 10 embodying the invention. The pressure testing apparatus 10 is used for subjecting one or more test specimens 12 (two are shown), such as pressure vessels, containers or pipe sections, for example, to alternating high and low pressures to pressure test the specimens 12.

The pressure testing apparatus 10 comprises first means for selectively supplying a first fluid under pressure to the test specimens 12. While various first fluid supply means can be employed, in the illustrated arrangement such means includes one or more hydraulic test circuits, each of which supports at least one test specimen 12. In the specific embodiment illustrated in FIG. 1, left and right hydraulic test circuits 14 and 16, respectively, are provided. The illustrated left and right test circuits 14 and 16 are identical and only the left test circuit 14 will be described in detail. Common reference numerals are used to describe components of both circuits.

As schematically shown in FIG. 1, the left test circuit 14 is provided with a twin cylinder accumulator assembly 18. The accumulator assembly 18 includes a first cylinder arrangement having a first cylinder 20 and a first piston 22 dividing the first cylinder 20 into first and second chambers 24 and 26, respectively. The first chamber 24 contains a first fluid, and the left test circuit 14 is provided with a fluid conduit 28 having one end communicating with the first chamber 24 and an opposite end communicating with the test specimen 12 supported in the left test circuit 14. The accumulator assembly 18 also includes a second cylinder arrangement having a second cylinder 30 preferably mounted in fixed coaxial relation to the first cylinder 20. The second cylinder arrangement also includes a second piston 32 dividing the second cylinder 30 into third and fourth chambers 34 and 36, respectively. The fourth chamber 36 is provided with a second fluid and communicates with a hydraulic pressure unit via a fluid conduit 38, as is more fully explained. While any suitable first and second fluids can be used, in the specific embodiment described herein the first fluid is water and the second fluid is oil.

Unlike prior art arrangements in which first and second fluids on opposite sides of a diaphragm or seal can contaminate one another, the accumulator assembly 18 includes a first cylinder arrangement for containing the water and a separate second cylinder arrangement for containing the oil. The first and second cylinder arrangements provide pressure containment and include suitable seals (not shown) for preventing water and oil leakage, respectively. This arrangement prevents the water and oil from mixing to contaminate one another.

The accumulator assembly 18 further includes means for connecting the pistons 22 and 32 for common linear movement. While various connecting means can be employed, in the illustrated arrangement the connecting means includes a common piston rod 40. In one embodiment, the common piston rod 40 can be formed by connecting separate piston rods. By interconnecting the pistons 22 and 32 the volumes of the chambers 24 and 36 of the accumulator assembly 18 are correlated such that decreased volume in one is accompanied by a corresponding increased volume in the other.

To pressurize the water in the first chamber 24 of the accumulator assembly 18, the fluid supply means also includes means for selectively supplying pressurized oil, or any other second fluid under pressure, to the fourth chamber 36. While various means for selectively supplying oil can be employed, in the illustrated arrangement such means includes a hydraulic pressure unit 42. The hydraulic pressure unit 42 includes an oil source which in the illustrated embodiment is an oil reservoir 44 maintained at ambient pressure. The hydraulic pressure unit 42 also includes an oil supply conduit 46 communicating with the oil reservoir 44 and a fluid pump 48 disposed in the supply conduit 46 for pumping oil from the oil reservoir 44 through the supply conduit 46.

To permit the return of exhausted oil from the fourth chamber 36 to the oil reservoir 44, the hydraulic pressure unit 42 is provided with oil return means. In the illustrated arrangement the return means includes a return conduit 50 communicating with the oil reservoir 44.

To cyclically pressurize the test specimen 12, the hydraulic pressure unit 42 includes means for selectively causing communication between the oil pump 48 and the fourth chamber 36 of the accumulator assembly 18. While various means for selectively causing communication between the oil pump 48 and the fourth chamber 36 can be employed, in the illustrated arrangement such means includes a solenoid actuated first valve 52 for alternatively connecting the conduit 38 to the supply conduit 46 and to the return conduit 50. The valve 52 is preferably a fourway valve shiftable between first and second operating modes or positions to allow communication between the conduit 46 and the conduit 38 and to prevent communication between the conduit 36 and the conduit 38, respectively. In another embodiment, the valve 52 in FIG. 1 can be a 3 position, 4-way valve. The center position of the 3 position valve permits the return of exhausted oil from the fourth chamber of both test circuits 14 and 16 to the oil reservoir 44 when neither circuit is being pressurized. In FIG. 1, the valve 52 is shown in the first position wherein oil is permitted to be pumped into the fourth chamber 36 of the accumulator assembly 18 in the left test circuit 14 and wherein oil is allowed to exhaust to the oil reservoir 44 from the accumulator assembly 18 in the right test circuit 16. When the first valve 52 is shifted to the second position this situation is reversed. Thus, in the arrangement illustrated in FIG. 1 the left and right test circuits 14 and 16 are 180 degrees out of phase with respect to each other.

The pressure testing apparatus 10 also comprises means for cycling the valve 52 between the first and second positions. While various means for cycling the valve 52 can be employed, in the illustrated arrangement such means includes a commercially available electronic control unit 54. The control unit 54 is operable to energize the solenoid actuated valve 52 to shift the valve 52 between its operative positions. The control unit 54 is also instrumental in maintaining a requisite level of water in the system, as is further explained below.

The pressure testing apparatus 10 also comprises second means which is separate from the aforementioned fluid supply means and which operates to supply an additional amount of water (make-up water) to the test specimen 12 in the event of a leak in the specimen or another part of the test circuit 14. While various means can be used for supplying additional water to the test specimen 12, in the illustrated arrangement such means includes means for detecting a leak in the specimen 12. The leak detection means includes means for sensing the distance the piston 22 moves when oil pressure is supplied to the fourth chamber 36 of the accumulator assembly 18 to detect when the piston 22 moves a distance in excess of the predetermined normal distance. In the illustrated arrangement movement of the piston 22 is measured by the movement of the piston rod 40. Accordingly piston rod position sensing means is provided.

The piston rod position sensing means includes a switch actuator 56 fixed centrally on the piston rod 40 for common movement therewith. The piston rod position sensing means also includes first and second proximity sensors 58 and 60, respectively, that are each actuatable by the switch actuator 56 and that are each electrically operably connected to the control unit 54. The proximity sensors 58 and 60 are longitudinally spaced apart with respect to the piston rod 40, the proximity sensor 58 being spaced from the proximity sensor 60 in the direction toward the cylinder 20.

The means for supplying make-up water also includes make-up means for supplying water to the test specimen 12 in response to the detection of a leak by the leak detection means. While various make-up means can be employed, in the illustrated arrangement such means includes a water source or reservoir 62 and a make-up conduit 64 having one end communicating with the test specimen 12 and an opposite end communicating with the water reservoir 62. A second pump 66 is disposed in the make-up conduit 64 for pumping water from the water reservoir 62 to the test specimen 12.

The make-up means also includes means for selectively causing communication between the water pump 66 and the test specimen 12. While various means can be employed, in the illustrated arrangement such means includes a solenoid actuated second valve 68 disposed in the make-up conduit 64 between the water pump 66 and the test specimen 12. The valve 68 is normally closed and the control unit 54 is operatively connected to the valve 68 such that the control unit 54 opens the valve 68 in response to actuation of the proximity sensor 58 by the switch actuator 56. If the valve 68 is not already closed, the control unit 54 closes the valve 68 in response to actuation of the proximity sensor 60 by the switch actuator 56. Thus, the make-up means supplies an additional amount of water to the test specimen 12 when the distance travelled by the piston rod 40 in the direction toward the cylinder 20 (to the left) is greater than a predetermined distance indicative of a no-leak condition.

The make-up means also includes valve means for preventing water from flowing to the valve 68 from the specimen 12 and for allowing water to flow from the valve 68 to the specimen 12. While various valve means can be employed, in the illustrated arrangement such means includes a check valve 76 disposed in the make-up conduit 64 between the valve 68 and the specimen 12.

To regulate the oil pressure provided by the hydraulic pressure unit 42, a control conduit 72 extending between the oil reservoir 44 and the fluid conduit 38 is provided with a pressure relief valve 74. Additionally, a pressure gauge 78 is provided to monitor water pressure conditions in the fluid conduit 28, and a relief valve 80 is provided to bleed air or excess water from the system.

Operation of the pressure testing apparatus 10 is explained below, it being understood that the left and right test circuits 14 and 16 operate in an identical manner but out of phase. With the valve 52 positioned as shown in FIG. 1, oil is pumped from the oil reservoir 44 into the fourth chamber 36 of the accumulator assembly 18 in the left test circuit 14. This causes the pistons 22 and 32 and interconnecting piston rod 40 to move to the left (as viewed in FIG. 1) a predetermined distance to compress the water in the chamber 24, thereby pressurizing the test specimen 12 in the left test circuit 14 to the desired pressure. In one embodiment of the invention the predetermined distance is about one to two inches. The valve 52, after a time delay, is then shifted to its second position by the control unit 54 to relieve oil pressure from the fourth chamber 36 to the oil reservoir 44 and to supply pressurized oil to the right test circuit 16. Referring to the left test circuit 14, as oil pressure in the fourth chamber 36 is relieved, the piston rod 40 moves to the right under the influence of water pressure in the chamber 24 until it reaches its starting position to complete one pressure cycle. The switch actuator 56, when the rod 40 reaches its starting position, actuates the proximity sensor 60 to signal the control unit 54 to close the valve 68 if the valve is not already closed.

The high pressure value of the pressure cycle can be raised or lowered as desired by replacing one or both of the cylinder arrangements with cylinder arrangements having different diameters to achieve pressure amplification or reduction. Alternatively, the oil pressure supplied by the oil pump 48 can be reduced using the pressure relief valves 74.

With reference to the left test circuit 14, in the event that leakage from the test specimen 12 results in water loss during testing, the piston rod 40 will move further to the left than is normal when the fourth chamber 36 is charged with oil. This excess movement causes the switch actuator 56 to actuate the proximity sensor 58 which in turn signals the control unit 54 to open the valve 68. Following shifting of the valve 52 to its second position, the piston rod 40 moves to the right and water is pumped through the open second valve 68 into the test specimen 12 to replace water lost due to leakage. When the piston rod 40 returns to its starting position under the influence of the back pressure supplied by the water pump 66, the switch actuator 56 is actuates the proximity sensor 60 which then signals the control unit 54 to close the valve 68. Thus, the test specimen 12 can be subjected to complete pressure cycles between a desired high pressure and the pressure in the oil reservoir 44 (i.e. ambient pressure).

Advantageously, the invention incorporates a twin cylinder accumulator arrangement which provides an environmentally secure system by preventing the cross-contamination of first and second fluids used in the system. Additionally, simple linear movement of the common piston rod 40 is used to detect leakage or other abnormal conditions and to actuate opening of the valve 68 to provide the test specimen 12 with make-up water. Since the valve 68 is normally closed, the test specimen 12 does not experience the back pressure of the water pump encountered in prior art arrangements, thereby enabling the test specimen 12 to be subjected to the full pressure range supplied by the hydraulic pressure unit 42.

Other features and advantages of the invention will be set forth in the following claims.

I claim:

1. An apparatus for pressure testing a specimen, said apparatus utilizing different first and second fluids, said first fluid being used to pressurize the specimen and said second fluid being used to pressurize said first fluid, the mixing of said fluids being undesirable, said apparatus comprising a first cylinder, a first piston dividing said first cylinder into first and second chambers, said first chamber containing said first fluid, a second cylinder, a second piston dividing said second cylinder into third and fourth chambers, means connecting said pistons such that the volume of said first chamber increases in response to a decrease in the volume of said fourth chamber and such that the volume of said first chamber decreases in response to an increase in the volume of said fourth chamber, means for selectively supplying said second fluid under pressure to said fourth chamber, a conduit having one end communicating with said first chamber and having an opposite end adapted to communicate with the specimen, and means separate from said first cylinder for supplying an additional amount of said first fluid to the specimen in the event of a leak including means for sensing the distance said first piston moves when said second fluid is supplied to said fourth chamber, and make-up means for supplying said additional amount of said first fluid when said distance is greater than a predetermined distance.

2. Apparatus as set forth in claim 1 wherein said make-up means includes a pump, and means for selectively causing communication between said pump and the specimen.

3. Apparatus as set forth in claim 2 wherein said means for selectively causing communication between said pump and the specimen includes a solenoid actuated valve.

4. Apparatus as set forth in claim 3 wherein said means for sensing said distance includes a proximity sensor, and wherein said make-up means also includes an electronic control unit operably connected to said proximity sensor and to said valve.

5. Apparatus as set forth in claim 4 wherein said cylinders are coaxial, wherein said means connecting said pistons includes a common piston rod, wherein said apparatus further comprises a switch actuator fixed to said piston rod for common movement therewith, wherein said proximity sensor is actuated by said switch actuator, and wherein said control unit opens said valve in response to actuation of said proximity sensor by said actuator.

6. Apparatus as set forth in claim 5 and further comprising a second proximity sensor which is spaced from said first sensor in the direction toward said second cylinder, and which is actuated by said actuator, and wherein said control unit closes said valve in response to actuation of said second sensor by said actuator.

7. Apparatus as set forth in claim 3 and further comprising means for preventing fluid flow from the specimen to said valve and for allowing fluid flow from said valve to the specimen.

8. An apparatus for pressure testing a specimen, said apparatus comprising
   a first cylinder,
   a first piston dividing said first cylinder into first and second chambers, said first chamber containing a first fluid,
   a second cylinder,
   a second piston dividing said second cylinder into third and fourth chambers, said fourth chamber containing a second fluid,
   a piston rod connecting said pistons for common movement such that the volume of said first chamber increases in response to a decrease in the volume of said fourth chamber and such that the volume of said first chamber decreases in response to an increase in the volume of said fourth chamber,
   a first conduit having one end communicating with said first chamber and having an opposite end adapted to communicate with the specimen,
   a switch actuator fixed to said piston rod for common movement therewith,
   first and second proximity sensors which are spaced longitudinally of said piston rod, and which are actuated by said switch actuator,
   a source of said second fluid,
   a first pump communicating with said source,
   a first valve operable in a first mode for allowing communication between said first pump and said fourth chamber and operable in a second mode for preventing communication between said first pump and said fourth chamber,
   means for cycling said first valve between said first and second modes,
   means for returning said second fluid from said fourth chamber to said source when said second piston moves in the direction decreasing the volume of said fourth chamber,
   a second pump,
   a second conduit having one end communicating with said second pump and having an opposite end adapted to communicate with the specimen, said second conduit having therein a solenoid actuated second valve,
   an electronic control unit operably connected to said proximity sensors and to said second valve, said control unit opening said second valve in response to actuation of said first proximity sensor by said actuator, and said control unit closing said second valve in response to actuation of said second proximity sensor by said actuator, and
   means for preventing fluid flow from the specimen to said second valve and for allowing fluid flow from said second valve to the specimen.

* * * * *